(12) United States Patent
Denneau et al.

(10) Patent No.: US 8,176,362 B2
(45) Date of Patent: May 8, 2012

(54) ONLINE MULTIPROCESSOR SYSTEM RELIABILITY DEFECT TESTING

(75) Inventors: Monty M Denneau, Brewster, NY (US); Vikram Iyengar, Pittsburgh, PA (US); Phillip J. Nigh, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 12/053,642

(22) Filed: Mar. 24, 2008

(65) Prior Publication Data
US 2009/0241124 A1    Sep. 24, 2009

(51) Int. Cl.
*G06F 11/00* (2006.01)
(52) U.S. Cl. ........................................................ 714/11
(58) Field of Classification Search .......... 714/1, 11–13, 714/47.1, 47.2, 48
See application file for complete search history.

(56) References Cited

U.S. PATENT DOCUMENTS

| | | | | |
|---|---|---|---|---|
| 3,678,467 A | * | 7/1972 | Nussbaum et al. | ............ 712/208 |
| 4,181,940 A | * | 1/1980 | Underwood et al. | ............ 714/25 |
| 6,170,070 B1 | | 1/2001 | Ju et al. | |
| 6,385,707 B1 | * | 5/2002 | Maffezzoni | .................... 711/162 |
| 6,587,970 B1 | * | 7/2003 | Wang et al. | ................... 714/47.2 |
| 7,602,304 B2 | * | 10/2009 | Tice | ............................... 340/630 |

OTHER PUBLICATIONS

REACT: a synthesis and evaluation tool for fault-tolerantmultiprocessor architectures, Clark, J.A.; Pradhan, D.K, Reliability and Maintainability Symposium, 1993. Proceedings., Annual, vol. , Issue , Jan. 26-28, 1993 pp. 428-435.

\* cited by examiner

*Primary Examiner* — Dieu-Minh Le
(74) *Attorney, Agent, or Firm* — Cantor Colburn LLP; Michael LeStrange

(57) ABSTRACT

A multiprocessor system comprising a plurality of processors is disclosed. The plurality of processors includes a first processor including first monitor on-chip and a second processor including a including a second monitor on-chip. The first monitor on-chip is configured to measure load on the second processor and the second monitor on-chip is configured to measure load on the first processor. The first monitor on-chip is configured to cause the second monitor on-chip to perform a self-test on the second processor if the load on the second processor is below a second processor load threshold value and the second monitor on-chip is configured to cause the first monitor on-chip to perform a self-test on the first processor if the load on the first processor is below first processor load threshold value.

15 Claims, 5 Drawing Sheets

ONLINE MULTIPROCESSOR SYSTEM RELIABILITY DEFECT TESTING

BACKGROUND OF THE INVENTION

Field of the Invention

The present invention is related generally to testing of computer elements and, in particular, to online testing for reliability defects in processors in a multi-processor system.

Integrated circuits are typically only tested once immediately following manufacturing. Such testing may not, however, discover small defects. That is, the integrated circuit may not perform perfectly but the defects fall within the tolerances defined for a particular integrated circuit.

Small defects in integrated circuits that are not detected in the manufacturing process may get worse over time. If the integrated circuits are not tested after the manufacturing stage, the defects may become greater and, eventually, lead to a failure of the integrated circuit. The terms "integrated circuit" and "processor" are used interchangeably herein. The integrated circuit may be considered a processor in and of itself or may form a portion of a larger processor.

In a very large networking architecture or multiprocessor system, reliability failures can lead to costly system downtime. For instance, if a processor fails before a problem associated therewith is detected and the processor is swapped out, that processor may cause the entire system to go down.

Therefore, there exists a need for systems and methods to run online tests on processors in a very large networking architecture or multiprocessor system to identify possible reliability defects.

SUMMARY OF THE INVENTION

One embodiment of the present invention is directed to a multiprocessor system. The multiprocessor system of this embodiment includes a plurality of processors that include a first processor including first monitor on-chip and a second processor including a second monitor on-chip. The first monitor on-chip is configured to measure load on the second processor and the second monitor on-chip is configured to measure load on the first processor. The first monitor on-chip is configured to cause the second monitor on-chip to perform a self-test on the second processor in the event the load on the second processor is below a second processor load threshold value and the second monitor on-chip is configured to cause the first monitor on-chip to perform a self-test on the first processor in the event the load on the first processor is below first processor load threshold value.

Another embodiment of the present invention is directed to a method of performing on-line reliability tests on a multiprocessor having a plurality of groups, each group having N processors and including a first processor and a second processor, and a central command processor. The method of this embodiment includes configuring each processor in at least one group to monitor the load on the N−1 other processors in the at least one group and to maintain a FIFO queue containing identifications for each if the N−1 other processors. The method of this embodiment also includes configuring the first processor to initiate a self-test to be performed by the second processor if the load on the second processor is below a threshold load value and the second processor is within a pre-specified position from a top of the FIFO queue maintained by the first processor.

Another embodiment of the present invention is directed to a method of performing on-line reliability testing in a multiprocessor system. The method of this embodiment includes monitoring, on a first processor, the load on a second processor; monitoring, on the second processor, the load on a third processor; and monitoring, on the third processor, the load on the first processor.

DETAILED DESCRIPTION OF THE INVENTION

Embodiments of the present invention relate to systems and methods for online testing of processors in networking architectures or large multiprocessor systems. In some embodiments they may detect reliability failures caused by worsening delay effects.

Figure 1:
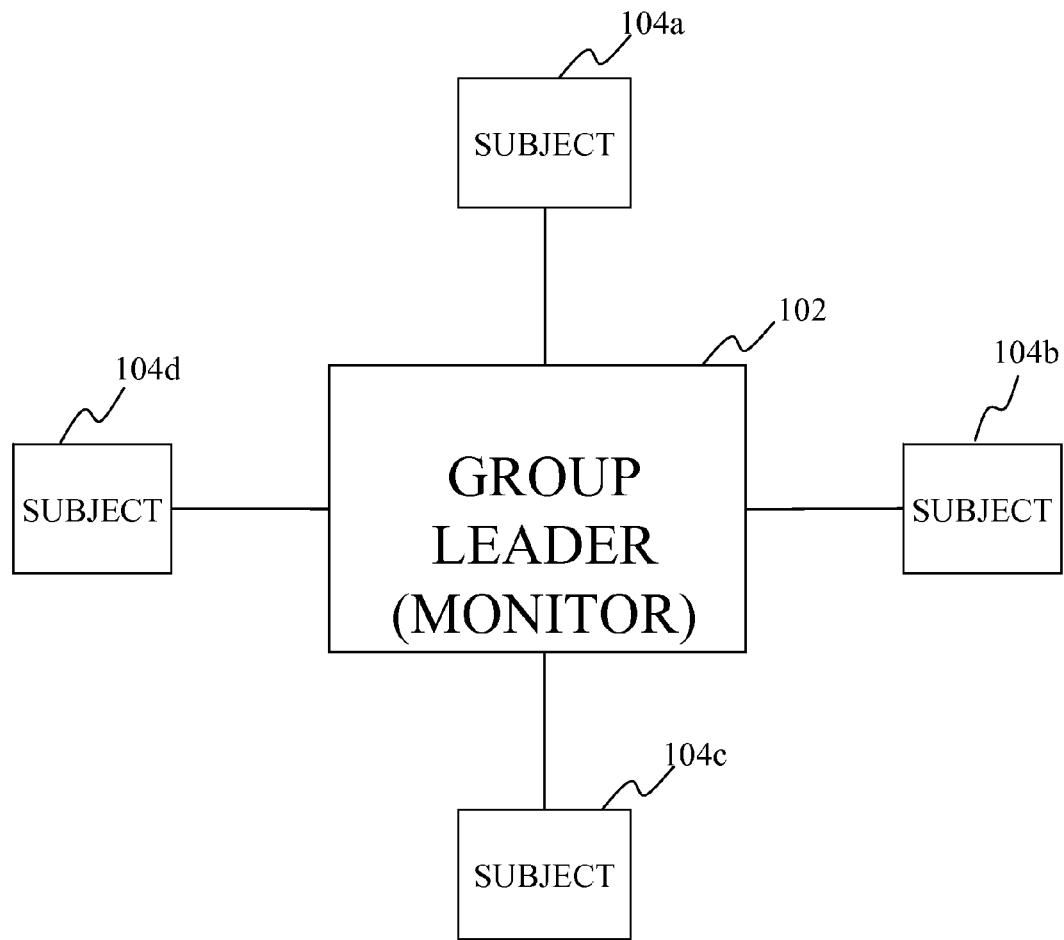
FIG. 1 shows a typical arrangement for monitoring processors in a prior art multiprocessor system.

FIG. 1 shows a typical arrangement for monitoring processors in a prior art multiprocessor system. The system includes a group leader 102. The group leader monitors the operation of several subject processors. For instance, the group leader 102 may monitor subjects 104a, 104b, 104c and 104d. Such a system may have drawbacks, however. For instance, if the group leader 102 fails there is no other processor assigned to monitor the subject processors 104. Furthermore, in such a system the group monitor 102 is not monitored on-line by any other processor. The only testing of group leader 102 typically occurs at power on. Thus, any defects in the group leader 102 may not be detected until it fails. As discussed above, failure of one processor may cause the entire system to fail.

Aspects of the present inventions allow for division of a multiprocessor system into a plurality of groups. Each of these groups may include N processors. Each group has a group leader, or monitor, and N−1 subjects.

As used herein, a "group" of N processors includes a processor designated as a group leader and its N−1 neighbors, which are designated as subjects. This may allow, for instance, the same N processors to be part of two different groups, the difference between the groups being in which processor is assigned as the monitor of the group. Of course, a group may be arbitrarily defined and the processors need not physically be neighbors but are referred to as such herein for ease of explanation.

Each of the subject processors, during operation, may report to the group leader. The group leader monitors the subject's operating loads and, subject to conditions described below, may cause one or more of the subjects to perform a self-test.

The present invention may also allow for the intersection of groups. This in turn may allow the group leader to be a subject in another group. Within each group when a particular processors workload goes below a predetermined value the group leader causes the processors work to be shifted to other available processors in the group. The subject is then put into an at-speed BIST state.

Each processor in the multiprocessor architecture has a monitor on-chip. The monitor is, in one embodiment, a finite state machine (FSM) that runs continuously in a so called mission mode. The monitor on-chip acts as a leader to the processor's neighbors as well as to its own processor. The monitor on-chip measures the load on each of the subjects while in mission mode.

Within each group the subject processors' IDs are kept in a queue. In one embodiment, the queue is a FIFO queue. The queue may be maintained in any location accessible to the group leader and, in one embodiment, is maintained by the group leader.

A processor's position in the queue is a measure of when it was last tested. When a subject's mission mode (i.e., normal operating mode) load falls below a predetermined level, the group leader will look at the queue to check whether the subject is due for a test. If the subject is in a predetermined position in the queue (i.e. near the top of the queue) it is due for a test. If the subject is due for a test, the leader will transfer the subject processor's load to another subject processor in the group and put the subject into a Logical Built-in Self-Test (LBIST) mode and an LBIST is run. If the subject fails it is taken out of the system. In some embodiments, the subject that failed may be swapped out with a spare processor.

Further details of the present invention will now be described with relations to FIGS. 2-5.

Figure 2A:
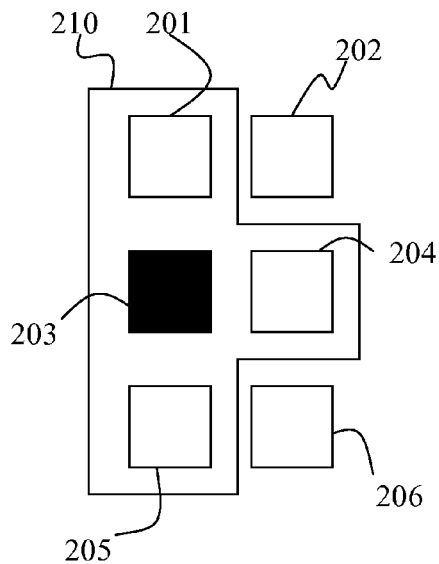
FIGS. 2a-2d show four different groups of processors arranged according to embodiments of the present invention.

FIGS. 2a-2d show four different groups of processors, 210, 212, 214, and 216, respectively. As shown in FIGS. 2a-2d, a group leader of a particular group is shown as a solid box and subject processors are shown in outline. For instance, the processor 203 in FIG. 2a is the group leader.

From time to time herein, the group leader may also be referred to as a first processor. However, group leaders may also be referred to as second and third processors. This is due to the fact that the processor, which is the leader in one group, may be a subject processor in another group. This ameliorates the problem discussed above with respect to having the group leader not being tested and ultimately failing because it was not monitored by other processors.

Referring back to FIGS. 2a-2d, each of the various views show a different grouping of processors. In the examples shown, the value N (equal to the number of processors in each group) equals 4. Of course, as one of ordinary skill in the art will readily realize the value of N is variable. In certain embodiments each group leader monitors N−1 other processors. For instance in FIG. 2a the group leader 203 monitors its neighbors 201, 204 and 205. This first group 210 has four members, thus, the group leader 203 monitors itself and the N−1 (3) other processors in the group.

Figure 2B:
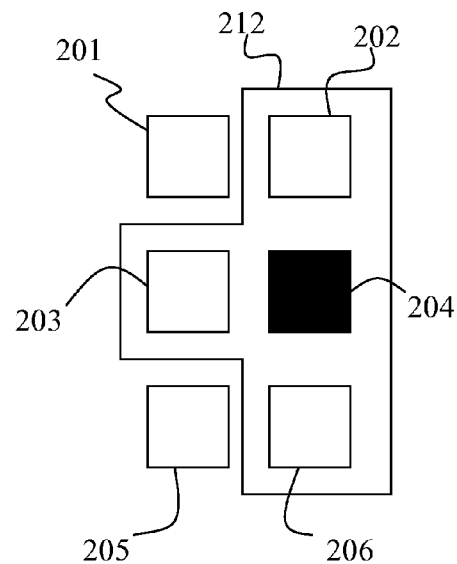

In FIG. 2b the group leader of group 212 is processor 204 and it monitors processors 202, 203 and 206. As discussed above, group leader 204 also monitors itself.

Figure 2C:
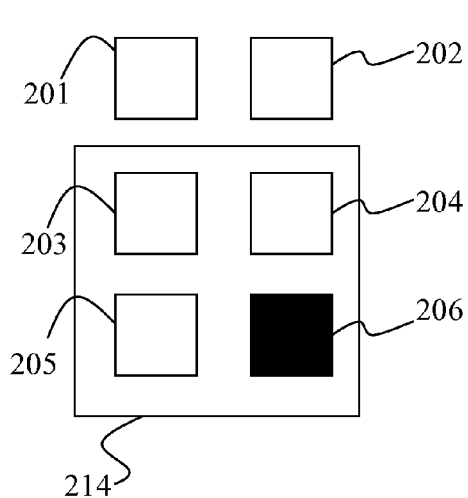

In FIG. 2c group 214 includes processors 203, 204, 205 and 206. The group leader is processor 206 and the subjects are processor 203, 204 and 205.

Figure 2D:
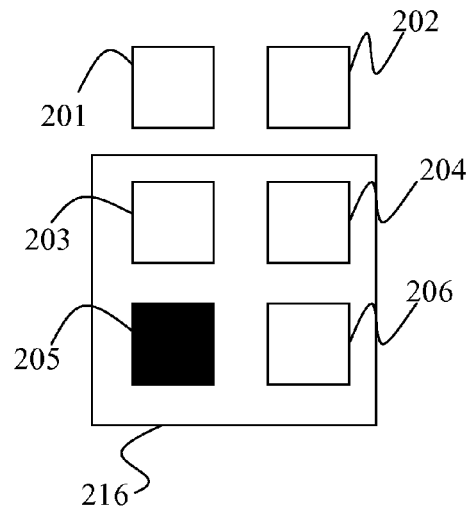

In FIG. 2d the group leader of group 216 is processor 205 and it monitors, as described above, processors 203, 204 and 206.

As can be seen in FIGS. 2a-2d processor 203 is the group leader in one group (group 210) but a subject in three other groups (groups 212, 214 and 216). This example shows the redundancy of systems according to the present invention embodiment. One advantage of such a system is that processor 203 is never only a group leader but is also a subject and, therefore, any delays or other defects that it may have will be tested, as described in further detail below, by several other processors. This may allow systems according to embodiments of the present invention to detect delays and other problems with the processors before they fail.

For instance, if a processor is determined to be near failure or otherwise malfunctioning, the system may swap the malfunctioning processor out for a spare processor if one exists. While the processor may not be physically removed, spare processors may be replaced logically for it. That is, the data that was to be processed by the failed processor is routed logically to a different location. To this end, systems according to the present invention may include additional spare processors. The switching of processors in and out may be performed by a central command processor (not shown).

As discussed above, each processor may include a monitor on-chip. This monitor, as is well known in the art, may be implemented as a finite state machine (FSM). The following flow diagrams in FIGS. 3-5 show methods that may be performed in these monitors on-chip.

Figure 3:
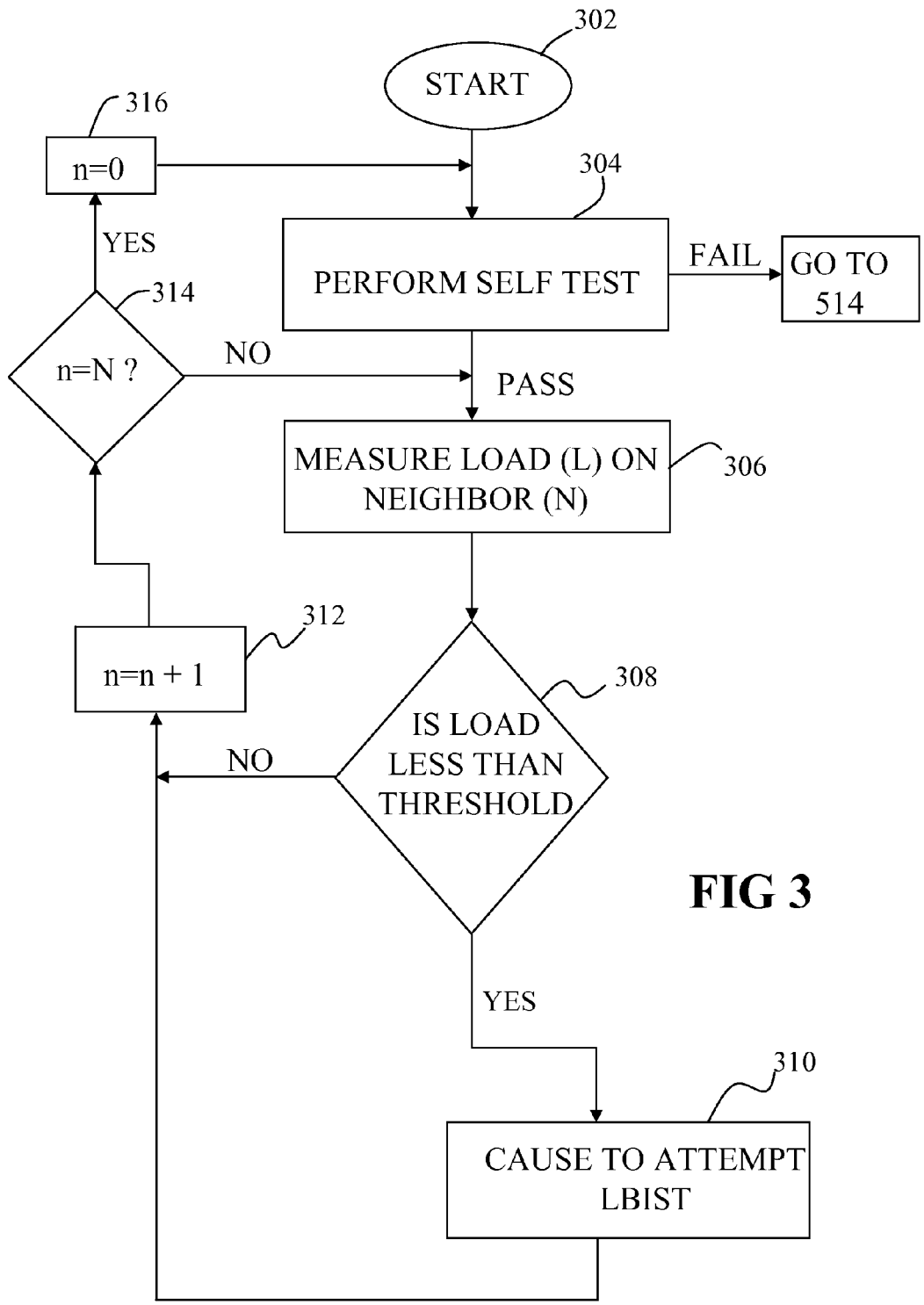
FIG. 3 shows an example of a process performed on a monitor on-chip according to an embodiment of the present invention.
Figure 4:
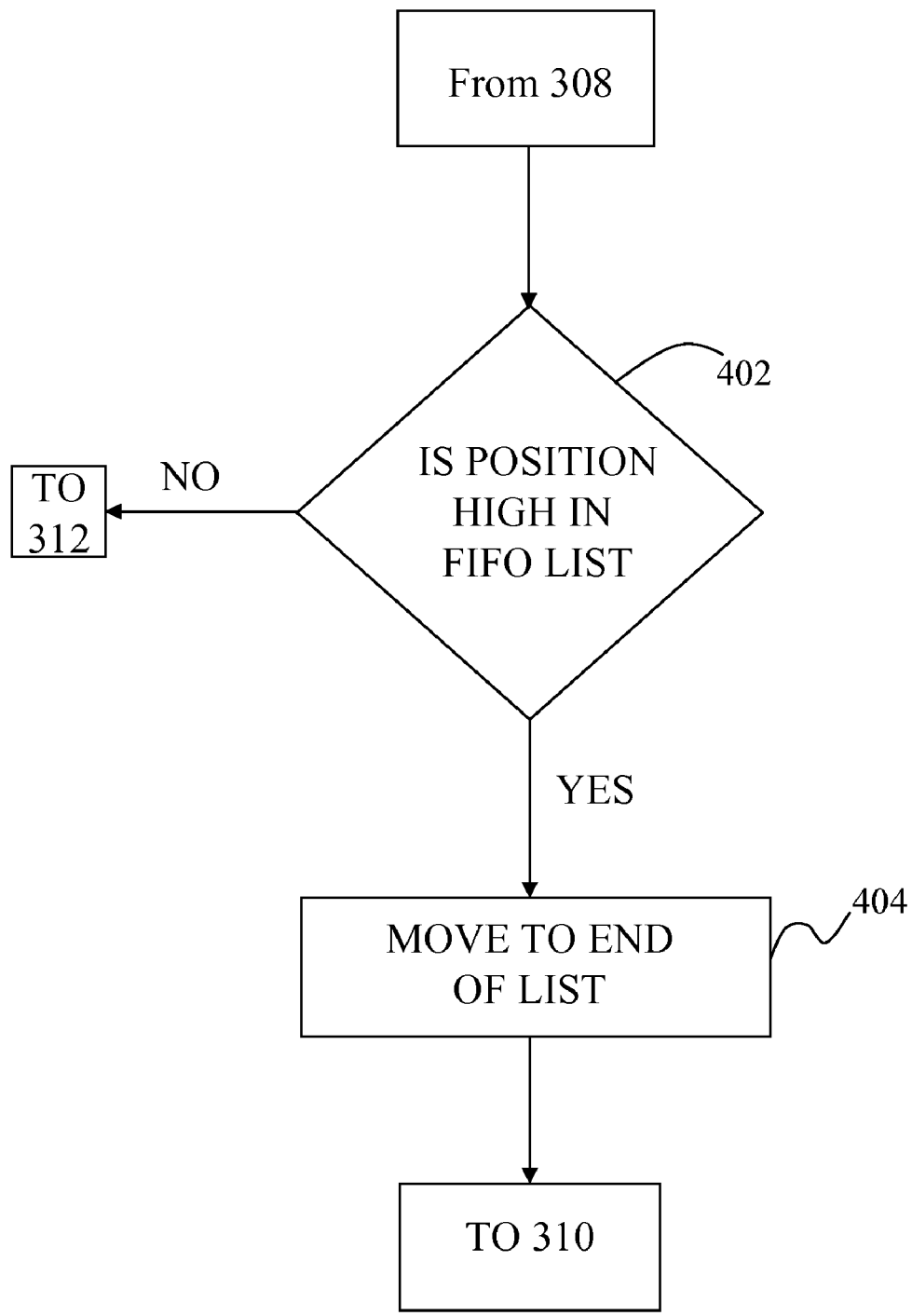
FIG. 4 shows additional steps to the process shown in FIG. 3, which may be taken to determine whether a subject processor should be placed in to a self-test, according to an embodiment of the present invention.

FIG. 3 shows an example of the process performed on a monitor on-chip. The process starts at block 302 when the processor is brought online. The processor performs a self-test as indicated at block 304.

The self tests may include, but are not limited to, a logic BIST, array BIST, functional BIST designed by customers, diagnostics including full speed memory writes and reads, at speed processor instructions, etc. Test generators include but are not limited to, on-chip hardware, on-chip software, off-chip hardware, off-chip software.

Figure 5:
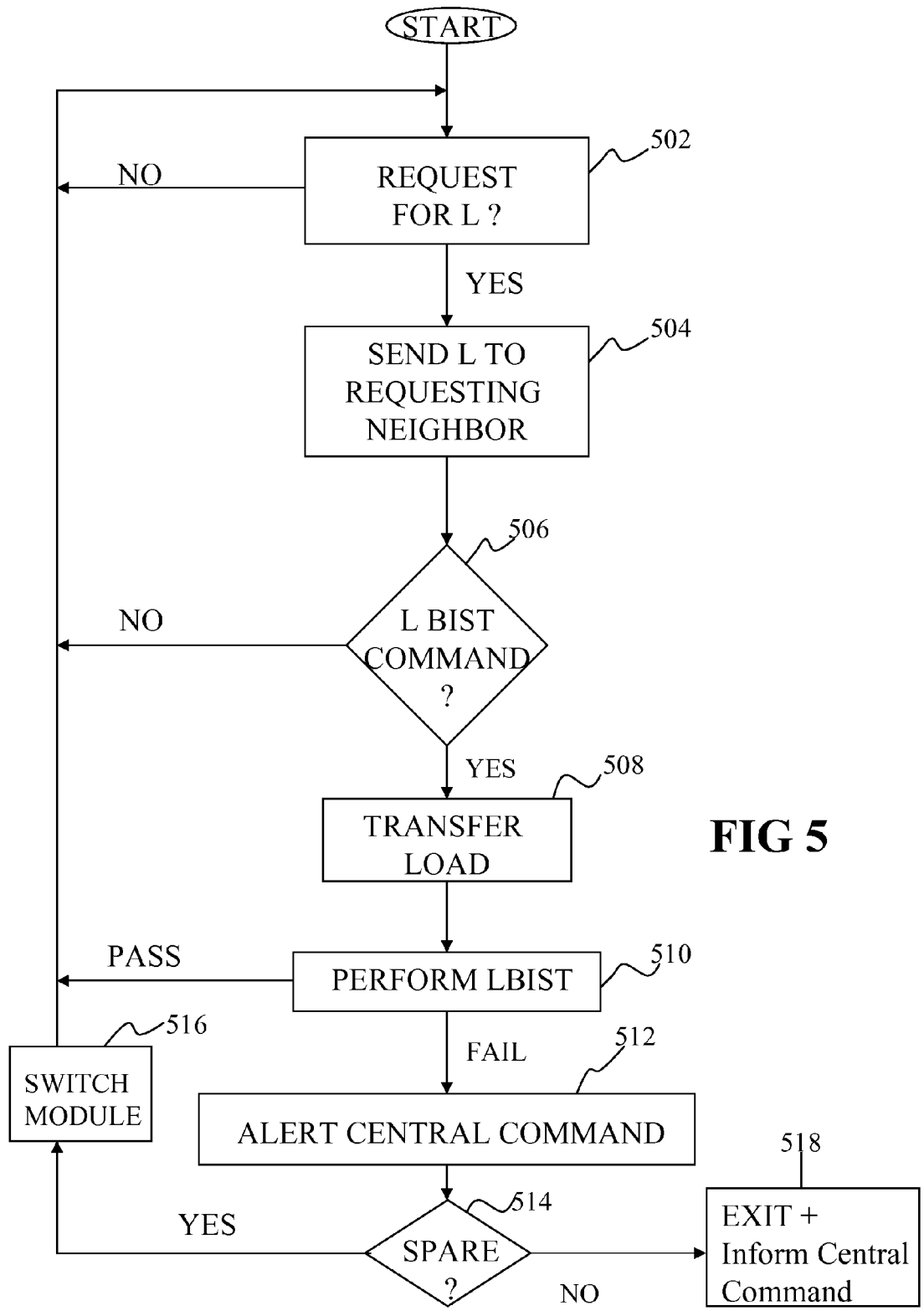
FIG. 5 shows a simplified flow diagram of a process according to an embodiment of the present invention that may be conducted at a subject processor.

If the processor fails the self test, the logic proceeds to block 514 of FIG. 5 (described herewith). If the processor passes the self-test the logic proceeds to block 306 where the load (L) on a neighbor chip (n) is measured.

As discussed previously, the multiprocessor system is divided into groups of N elements. Each element (processor) of the group is placed in a queue. The position of an element in the queue reflects the time it was last tested relative to the last time the other elements in the group were tested. The value n is used to step through each of the neighbor chips from the group monitor. This process is continued, as discussed below, until n=N at which time the process may restart. Following block 306, the load (L) of the neighbor (n) is then compared to a threshold in block 308. If the load is less than the threshold the logic proceeds to block 310 where the monitor of the group leader sends a signal to the neighbor to perform an LBIST. If the load is not less than the threshold, as determined in block 308, the logic moves to block 312 where the value of n is set to n+1.

At block 314 it is determined whether n=N. If n does not equal N, there are more neighbors (subjects) to be tested and control is returned to block 306. If n=N then n is reset to 0 at block 316 and the process is restarted.

FIG. 4 shows additional steps which may be taken to determine whether a subject should be placed in to a self-test. The process shown in FIG. 4 may, optionally, be interspersed between blocks 308 and 310 shown in FIG. 3.

Having determined that the load is less than the threshold in block 308, at block 402 it is determined whether the current neighbor being examined is located in a predetermined position in the test queue. As shown, this determination is made by examining if the subject processor is high in the FIFO list. That is, the predetermined position may mean that it is within the top couple of entries in the FIFO list and the test queue may be implemented as a FIFO list. Of course, other types of lists could be used.

If the neighbor is high in the test queue it is moved to the end of the test queue at block 404 and control is returned to block 310. If the neighbor is not high in the test queue the control is returned to block 312.

FIG. 5 shows a simplified flow diagram of a process according to the present invention that may be conducted at a subject processor.

The process begins at block 502 where the subject processor determines if a group monitor has requested a value representing a load on the processor. If such a request has not been made the processor returns to step 502 and waits for such a request as is well known in the art.

If the group monitor has requested a load that load is sent to the requesting neighbor at block 504. As discussed above, if the load on a certain processor is below a certain level and the subject processor is high on the test list, a self-test command may be issued. In block 506 it is determined if such a command has been issued. If such a command has been issued the process continues to block 508, else the process returns to block 502.

In the event that a self-test command has been issued, the load from the processor is transferred to a neighbor having available processing capability to handle additional load at block 508. In some embodiments this may be accomplished by utilizing a central command processor to determine where the load should be shifted.

After the load has been shifted the self-test, in particular an LBIST, is performed at block 510. If the test returns a fail indication, the central command is notified at block 512. If the self test returns a pass indication, the process returns to block 502.

After central command has been notified in block at block 512, it is determined whether there is a spare processor, or a redundant module, to switch the module into at block 514. In the event that there is no spare central command is notified and a chip error is reported at block 518. If there is a spare processor, control passes to block 516 where the module switched in to replace the malfunctioning processor, and the process returns to block 502.

While the invention has been described with reference to illustrative embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A multiprocessor system, comprising:
a plurality of processors including:
a first processor including a first monitor on-chip; and
a second processor including a second monitor on-chip;
wherein the first monitor on-chip is configured to measure load on the second processor and the second monitor on-chip is configured to measure load on the first processor and wherein the first monitor on-chip is configured to cause the second monitor on-chip to perform a self-test on the second processor in the event the load on the second processor is below a second processor load threshold value and the second monitor on-chip is configured to cause the first monitor on-chip to perform a self-test on the first processor in the event the load on the first processor is below first processor load threshold value.

2. The multiprocessor system of claim 1, wherein the self-test is a logic built-in self-test (LBIST).

3. The multiprocessor system of claim 1, wherein the first processor and the second processor are part of a first group including N processors and wherein the first monitor on-chip is configured to monitor the load on the other N−1 processors the first group.

4. The multiprocessor system of claim 3, wherein in the second monitor on-chip is configured to monitor the load on a third chip included in a second group of processor.

5. The multiprocessor system of claim 1, wherein the first processor is part of a first group of processors and the second processor is part of a second group of processors.

6. The multiprocessor system of claim 1, further comprising:
at least one spare processor; and
a central command processor.

7. The multiprocessor of claim 6, wherein the central command processor is configured to cause processing being performed on the second processor to be transferred to the at least one spare processor in the event the second processor fails the self-test.

8. The multiprocessor system of claim 1, wherein the first and second processors are both part of a first group of processors and the second processor is part of a second group of processors that does not include all of the processors of the first group of processors.

9. A method of performing on-line reliability tests on a multiprocessor having a plurality of groups, each group having N processors and including a first processor and a second processor, and a central command processor, the method comprising:
configuring each processor in at least one group to monitor the load on the N−1 other processors in the at least one group and to maintain a first-in first-out (FIFO) queue containing identifications for each if the N−1 other processors; and
configuring the first processor to initiate a self-test to be performed by the second processor if the load on the second processor is below a threshold load value and the second processor is within a pre-specified position from a top of the FIFO queue maintained by the first processor.

10. The method of claim 9, further comprising:
placing the second processor at the bottom of the FIFO queue maintained by the first processor after the first processor initiates the second processor to perform the self-test.

11. The method of claim 9, further comprising:
receiving a self-test command at the second processor;
transferring the load on the second processor to an available neighbor processor; and
performing an LBIST on the second processor.

12. The method of claim 11, further comprising:
notifying the central command processor that the LBIST failed; and
switching processing performed by the second processor to a spare processor.

13. A method of performing on-line reliability testing in a multiprocessor system, the method comprising:
monitoring, on a first processor, the load on a second processor;

monitoring, on the second processor, the load on a third processor; and monitoring, on the third processor, the load on the first processor;

determining if the load on the second processor is below a load threshold;

determining the location of the second processor in a test position queue; and initiating a self test on the second processor if the load on the processor is below a load threshold and the second processor is located within a group of predetermined positions in the test position queue maintained by the first processor.

14. The method of claim 13, wherein determining if the load is below a load threshold, determining the location of the second processor in a test position queue maintained by the first processor, and initiating is performed by a monitor on-chip on the first processor.

15. The method of claim 13, further comprising:

determining if the load on the third processor is below a load threshold;

determining the location of the third processor in a test position queue maintained by the third processor; and initiating a self test on the third processor if the load on the processor is below a load threshold and the second processor is located within a group of predetermined positions in the test position queue maintained by the second processor.

* * * * *